United States Patent [19]

Takahama

[11] Patent Number: 4,644,659
[45] Date of Patent: Feb. 24, 1987

[54] TRANSIT

[75] Inventor: Akio Takahama, Yokohama, Japan

[73] Assignee: Nippon Kogaku K. K., Tokyo, Japan

[21] Appl. No.: 742,869

[22] Filed: Jun. 10, 1985

[30] Foreign Application Priority Data

Jun. 25, 1984 [JP] Japan ............................ 59-130414

[51] Int. Cl.[4] ............................................. G01C 11/06
[52] U.S. Cl. .................................. 33/1 T; 33/1 PT; 33/285
[58] Field of Search ............. 33/1 T, 1 PT, 267, 285; 250/231 SE; 356/141

[56] References Cited

U.S. PATENT DOCUMENTS

| | | | |
|---|---|---|---|
| 3,826,318 | 7/1974 | Baumgartner | 177/25 |
| 4,093,383 | 6/1978 | Feist et al. | 33/1 T |
| 4,095,348 | 6/1978 | Kramer | 33/1 PT |
| 4,129,862 | 12/1978 | Kaplan et al. | 250/231 SE |
| 4,281,463 | 8/1981 | Kobayashi et al. | 33/285 |
| 4,318,225 | 3/1982 | Jenkinson | 33/1 PT |
| 4,358,753 | 11/1982 | Cascini | 250/231 SE |
| 4,466,189 | 8/1984 | Tobin, Jr. | 33/267 |

FOREIGN PATENT DOCUMENTS

| | | | |
|---|---|---|---|
| 105010 | 6/1983 | Japan | 33/285 |
| 165011 | 9/1983 | Japan . | |

*Primary Examiner*—Richard R. Stearns
*Attorney, Agent, or Firm*—Shapiro and Shapiro

[57] ABSTRACT

A transit includes a first rotational member provided with a collimator and supported on the transit for rotation about a predetermined axis, a second rotational member supported on the transit for rotation about the predetermined axis, a detector for generating a pulse in accordance with a predetermined angle of displacement between the first rotational member and the second rotational member, a first counter for counting the number of pulses from the detector, the maximum countable pulse number of the first counter corresponding to the angle of 360°, the first counter generating a pulse in accordance with its counting of the maximum pulse number, and a second counter for counting the pulses from the first counter means up to a predetermined number.

11 Claims, 8 Drawing Figures

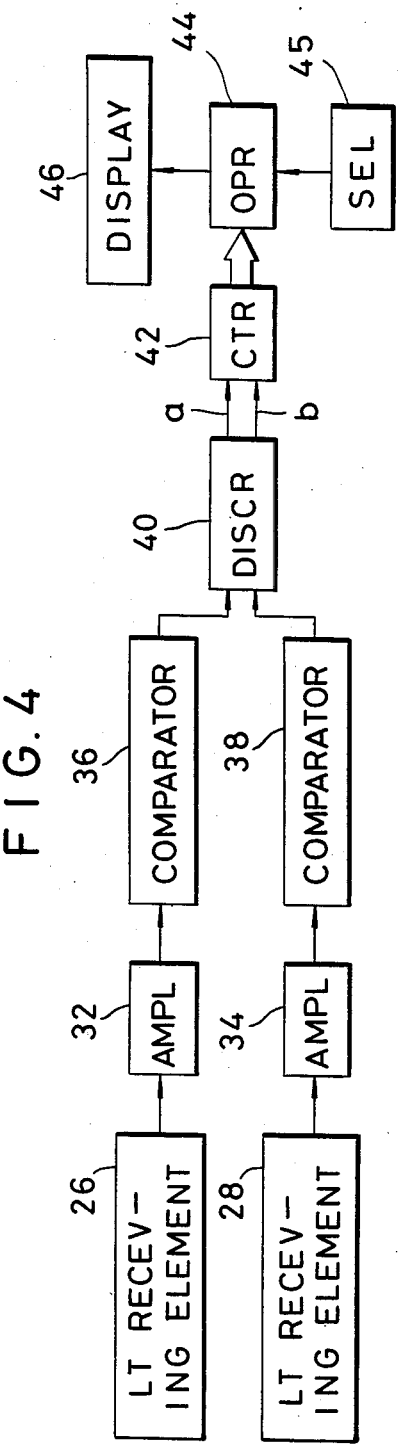
F I G. 4
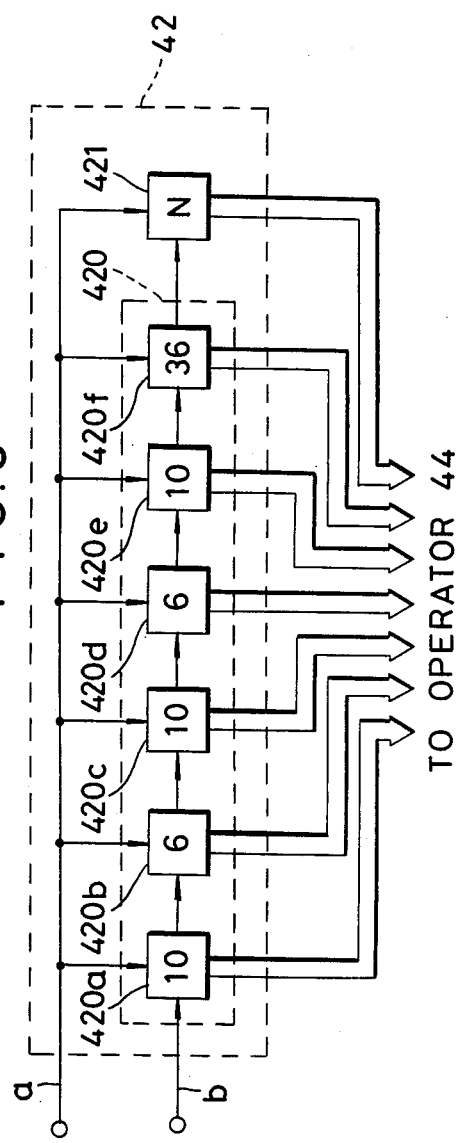
F I G. 5

TRANSIT

BACKGROUND OF THE INVENTION

1. Field of the Invention

This invention relates to a double axis type transit which is capable of effecting repeated measurement of an angle to be measured.

2. Description of the Prior Art

The repetitive measuring method is effected to reduce the influence of the error resulting from the structural defect of the transit or the incompleteness of adjustment as well as the influence of the error resulting from the observation operation such as collimation or reading. The transit is comprised of a base, first and second rotational members coaxial with the base and rotatable, means for measuring the angle between the first rotational member and the second rotational member, and a collimator secured to the first rotational member. Accordingly, the repetitive measuring method, as shown in FIG. 1 of the accompanying drawings, comprises installing the transit at a point 0, fixing the base thereof, and rotating the first rotational member with the second rotational member to thereby collimate a point A by the collimator. Let it be assumed that the then angle of the first rotational member with respect to the base is $\alpha_0$. Subsequently, the first rotational member is made rotatable with the second rotational member remaining fixed to the base and a point B is collimated by the collimator to thereby measure an angle $\alpha_1$. Then, the first rotational member and the second rotational member are rotated together relative to the base and the point A is again collimated by the collimator, and subsequently the second rotational member is fixed to the base, while the first rotational member is made rotatable and the point B is collimated by the collimator to thereby measure the angle. The cumulative measured value when the space between the points A and B has been measured n times in this manner is defined as $\alpha_n$, and the angle $\alpha$ of <AOB is found from $$\alpha = (\alpha_n - \alpha_0)/n$$

Now, the transit disclosed in Japanese Laid-open Patent Application No. 165011/1983 comprises a base, a first rotational member having a collimator and supported on said base for rotation about a vertical axis, a second rotational member supported for rotation about said vertical axis relative to the base and the first rotational member, measuring means for measuring the relative angular displacement between said first rotational member and said second rotational member by a binary code, digital display means for displaying the measurement value of said measuring means, digital display clearing means for rendering the digital display means into a zero value when the measurement value of said measuring means has become 360°, and inhibiting means for selectively inhibiting the clearing function of said digital display clearing means, and has been designed such that the digital display means displays a right measurement value even when the measured angle by the repetitive measuring method or the like exceeds 360°.

However, in the above-described apparatus, the inhibition of the clearing function of the digital display clearing means by the inhibiting means is effected in a circuit-like fashion, and this has led to a disadvantage that the apparatus is complicated in structure.

Also, suppose a case where the maximum countable number of a counter for counting the binary code corresponding to the relative angular displacement is not integer times as great as 360°. When this counter counts the maximum countable number, e.g., 1000, the content of the counter returns to zero and therefore, when the counter counts down from this state, the content of the counter changes to 999, 998, . . . . However, where subtraction is effected from zero (it is to be understood that the angle changes by 1° each), the angle changes to 359, 358, . . . . Accordingly, where the maximum countable number of the counter is not integer times as great as 360°, the count number of the counter must be corrected, and this leads to a disadvantage that the apparatus becomes complicated.

SUMMARY OF THE INVENTION

It is an object of the present invention to provide a transit which is simple in structure.

To achieve the above object, the transit of the present invention for detecting the relative angular displacement between a first rotational member and a second rotational member is designed such that the detected angle is latched and the maximum latchable angle is integer times as great as 360°.

Further, the present invention is designed such that the detected angle is converted into a binary code, the converted binary code is counted, the maximum countable value is integer times as great as 360° and whether the result of the counting is to be displayed as being greater than 0° and less than 360° or to be intactly displayed is selected.

BRIEF DESCRIPTION OF THE DRAWINGS

FIG. 4 is a block diagram of a first embodiment of the operation display circuit.

FIG. 5 shows the construction of a counter.

DESCRIPTION OF THE PREFERRED EMBODIMENTS

Figure 1:
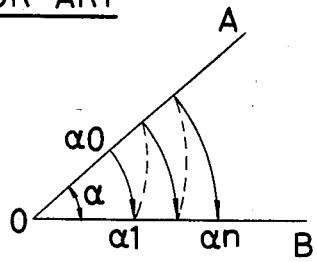
FIG. 1 illustrates the principle of the repetitive measuring method.
Figure 2:
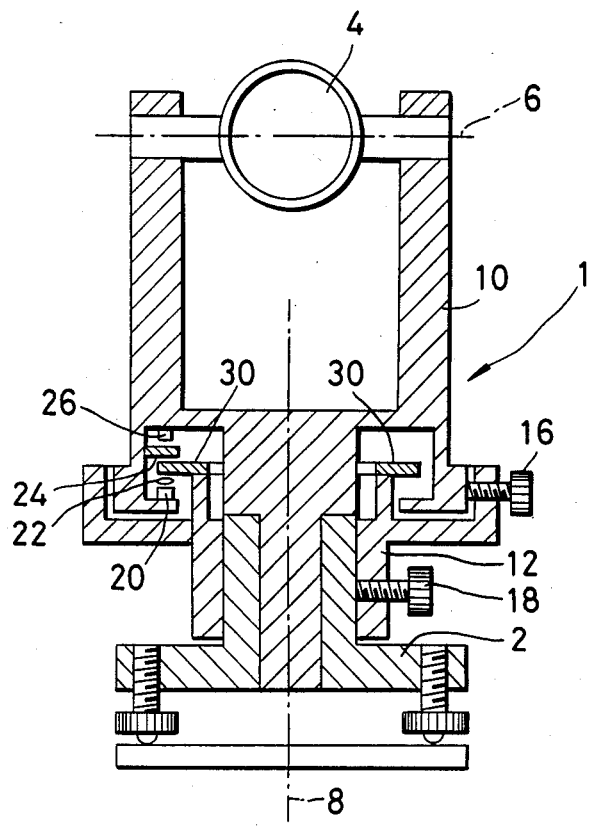
FIG. 2 illustrates a digital transit according to an embodiment of the present invention.
Figure 3:
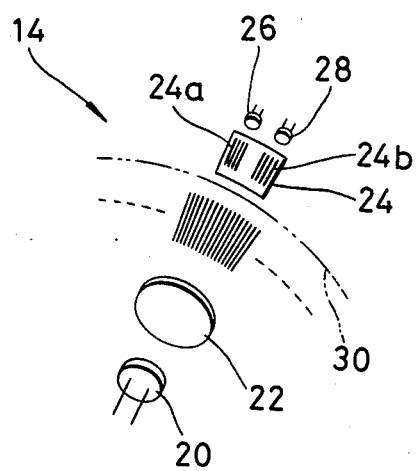
FIG. 3 is an enlarged illustration of the angle display system of FIG. 2.

Some embodiments of the present invention will hereinafter be described with reference to the drawings. The mechanism of a double axis type digital transit, as shown in FIG. 2, comprises a first rotational member 10 supporting a collimator 4 for rotation about a horizonal axis 6 and supported on a base 2 for rotation about a vertical axis 8, a second rotational member (upper board) 12 supported for rotation about the vertical axis 8 relative to the base 2 and the first rotational member 10, and an angle measuring system 14 (FIG. 3) for measuring the angular relative displacement between the first rotational member 10 and the second rotational member 12 by a binary code. The second rotational member 12 has a first clamp screw 16 for making the second rotational member 12 integral with the first rotational member 10, and a second clamp screw 18 for making the second rotational member 12 integral with the base 2. The angle measuring system 14 is a so-called rotary encorder as shown in FIG. 3 and comprises a light source 20, a condenser lens 22, an index slit 24 and two light-receiving elements 26, 28 mounted on the first rotational member 10, and a code plate 30 mounted on the second rotational member 12. The index slit 24 comprises two slit groups 24a and 24b disposed so that the output signals of the light-receiving elements 26 and 28 are 90° out of phase with each other. The technique of making the output signals of two light-receiving elements out of phase with each other by the arrangement of the code plate 30 and the index slit 24 is already known and is described, for example, in U.S. Pat. No. 3,826,318. However, this U.S. Patent is a technique regarding a linear encoder.

As regards a first embodiment of the operation display circuit of the outputs of the light-receiving elements 26, 28, the outputs of the light-receiving elements 27, 28 are connected to a direction discriminator 40 through amplifiers 32, 34 and comparators 36, 38, as shown in FIG. 4. The direction discriminator 40 puts out to a counter 42 a signal a indicative of the direction of rotation of the first rotational member 10 and the second rotational member 12 and a signal b indicative of the angle thereof. The counter 42 puts out to an operator 44 a signal of binary code indicative of the counted value, and the operator 44 processes the signal from the counter 42 and puts it out to a digital display device 46. The counter 42, as shown in FIG. 5, is so constructed that a counter group 420 (first counter) having 359°59′59″ as a maximum count value and an N-nary counter 421 (second counter) are connected together, and the counter group 420 is comprised of a decimal counter 420a, a six-nary counter 420b, a decimal counter 420c, a six-nary counter 420d, a decimal counter 420e and a thirty-six-nary counter 420f, which are up-/down counters. The counter group 420 has 359°59′59″ as the maximum countable value and further, when it counts a pulse of the signal b corresponding to an angle 1″, the counter group 420 inputs a pulse to the N-nary counter 421 and is reset. However, of course, the construction of the counters may be changed depending on the resolving power of the measured angle. The number N of the N-nary counter 421 is selected so that the counter 42 does not overflow by the angles accumulated by repeated measurement.

A select switch 45 capable of selecting the repetitive measuring method in its ON position and selecting the usual measurement in its OFF position is connected to the operator 44.

In the above-described circuit construction, two angle signals having a phase difference of 90° which have been detected by the light-receiving elements 26, 28 are amplified by the amplifiers 32 and 34 and converted into rectangular waves by the comparators 36 and 38 and further, the two angle signals are converted by the direction discriminator 40 into a signal a indicative of the count-up or count-down to the up/down counter 42 and a signal b generating a pulse for a change of the angle 1″. The pulse count value counted by the counter 42 is supplied to the operator 44.

The operations of the counters 420–420f constituting the counter group 420 will now be described with respect typically, to the counters 420a and 420b. The decimal counter 420a counts the pulse number indicated by the signal b when the signal a is indicative of count-up, and counts up to 10 when it begins to count from zero, and renders the result of the count into zero and causes the six-nary counter 420b to generate a pulse. When the signal a is indicative of count-down, the content of the counter 420a is zero and when a pulse is input thereto, a pulse is generated in the six-nary counter 420b. The operations of the remaining counters 420c–420f are similar to the operations of the decimal counter and the six-nary counter with the exception that the maximum countable pulse number of the decimal counter is 10 and the maximum countable pulse number of the six-nary counter is 6. Also, the counters 420a–420f put out in parallelism binary signals indicative of the result of count.

Figure 6:
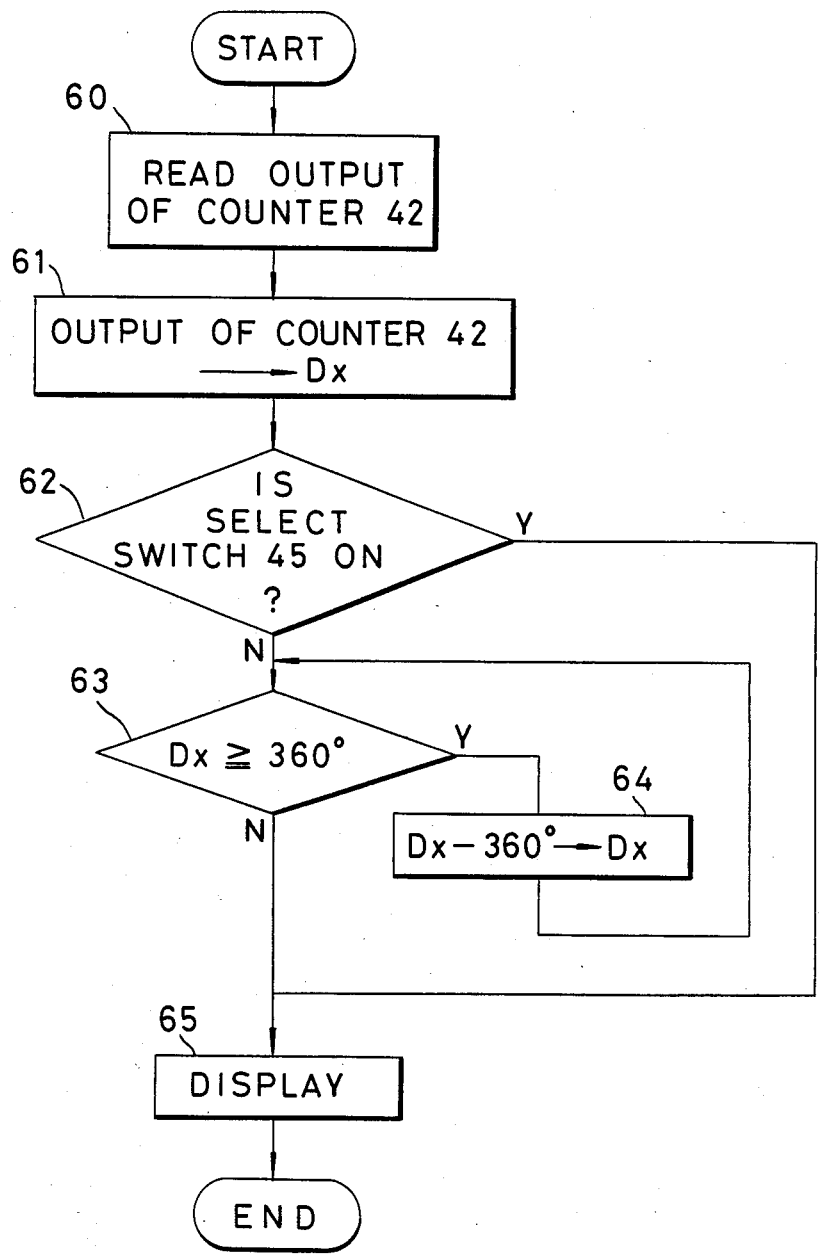
FIG. 6 is a flow chart of an operator.

The operator 44 comprises, for example, a microcomputer and the flow chart thereof is as shown in FIG. 6. At step 60, the operator 44 reads the output from the counter 42, and at step 61, it stores the output of the counter 42 as $D_x$, and at step 62, it reads the ON or OFF of the select switch 45 and when the select switch 45 is OFF, the operator 44 subtracts as angle integer times as great as 360° from the pulse count value and converts the displayed value from 0° to a value less than 360° (steps 63 and 64) if the pulse count value exceeds 360°. This is similar to the operation of the conventional digital transit. Where the repetitive measuring method in which the accumulated angle value exceeds 360° is carried out, if the select switch 45 is brought into its ON position, the operator 44 does not effect the subtraction as described above even if the count value of the counter exceeds 360°, because this is the case of the repetitive measuring method, and the value indicated by the data $D_x$ is displayed on the digital display device 46 (step 65). The measured value may be found by dividing the accumulated angle value displayed on the digital display device 46 by the frequency of the repeated measurement.

Figure 7:
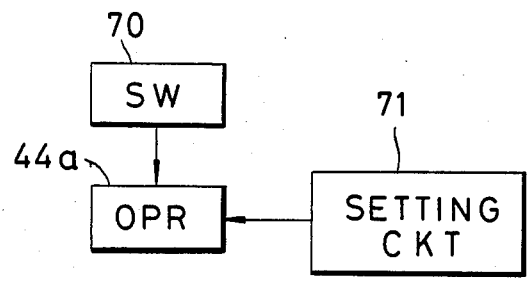
FIG. 7 is a block diagram of a second embodiment of the operation display circuit.

In the above-described embodiment, the accumulated angle value is displayed on the digital display device 46 during the repeated measurement and therefore, it has been necessary to divide the displayed value by the frequency of the repeated measurement in order to find the measured value, but a second embodiment in which said measured value is directly displayed will now be described by reference to FIG. 7.

In the second embodiment, the light-receiving elements 26, 28, the amplifiers 32, 34, the comparators 36, 38, the discriminator 40, the counter 42 and the display device 46 are identical to those in the first embodiment and therefore need not be described. A setting circuit 71 for setting the frequency of the repeated measurement is connected to an operator 44a, and a measurement termination switch 70 is further connected to the operator 44a.

In the above-described circuit construction, the frequency k of the repeated measurement of 1 or 2 or more is set by the setting circuit 71. When the frequency k of the repeated measurement is set to 1 by the setting circuit 71, the operator 44a subtracts an angle integer times as great as 360° from the pulse count value if the pulse count value exceeds 360°. When the frequency k of the repeated measurement is set to 2 or more, in other words, when repeated measurement is to be effected, the operator 44a does not effect said subtraction. When a measurement termination signal is input by the ON of the measurement termination switch 70, the operator 44a reads the count value from the counter 42 and divides it by the frequency of the repeated measurement set by the setting circuit 71.

Figure 8:
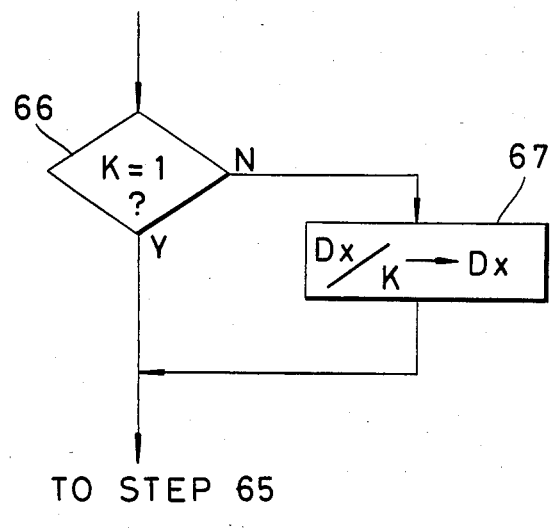
FIG. 8 is a flow chart of the second embodiment.

The result of that operation is the measured value, which is displayed on the digital display device 46. The flow chart of the operator 44a except the portions thereof which overlap the flow chart of FIG. 6 is shown in FIG. 8. When, at step 62, it is judged that the switch 45 is ON, whether the frequency k of the repeated measurement is 1 or 2 or more is judged at step 66 and, if the frequency k is 1, the operator may proceed to step 65 and, if the frequency k is 2 or more, the operator may proceed to step 65 via step 67 at which the data $D_x$ of the counter 42 is divided by the frequency k.

In any of the above-described embodiments, the counter group 420 may be constructed in any manner as required. That is, in the example of FIG. 5, the counter group 420 is constructed by combining chiefly decimal counters, but it may also be constructed by combining chiefly sixteen-nary counters to reduce the number of digits.

Also, if the counter group 420 of the construction as shown in FIG. 5 is used, the operator 44 may also be designed so as to effect subtraction by discarding the content of the N-nary counter 421 representative of integer times 360° from the count value of the counter 42 and put out only the value of the first counter group 420. Also, the counter 42 has been shown as comprising up/down counters connected together in series, but a time lag occurs between the transmission of pulse from counter to counter and the pulse of the actual signal b. Accordingly, to reduce this time lag, the up/down counters may be parallel-connected together.

Further, the measuring system 14 may be, for example, a potentiometer or a magnetic encoder.

I claim:
1. A transit including:
   (a) a first rotational member provided with a collimator and supported on said transit for rotation about a predetermined axis;
   (b) a second rotational member supported on said transit for rotation about said predetermined axis;
   (c) detection means for generating a pulse in accordance with a predetermined angle of displacement between said first rotational member and said second rotational member;
   (d) first counter means for counting the number of pulses from said detection means, the maximum countable pulse number of said first counter means corresponding to the angle of 360°, said first counter means generating a pulse in accordance with its counting of the maximum pulse number; and
   (e) second counter means for counting the pulses from said first counter means up to a predetermined number.

2. A transit according to claim 1, wherein said first counter means changes the content thereof to zero in response to its counting of said maximum pulse number.

3. A transit according to claim 2, wherein said second counter means changes the content thereof to zero in response to its counting of said predetermined number of pulses.

4. A transit according to claim 3, wherein said detection means produces a detection signal indicative of the direction of the angular displacement between said first rotational member and said second rotational member, and said first and second counter means change over the count-up and count-down of said pulses in accordance with said detection signal.

5. A transit according to claim 1, wherein said first and second counter means put out signals corresponding to the number of counted pulses, and said transit further includes setting means for setting a number, and dividing means for dividing the angle indicated by the signals from said first and second counter means by the number set by said setting means.

6. A transit according to claim 5, further including converter means for converting the angle indicated by the signals from said first and second counter means into an angle greater than 0° and less than 360°.

7. A transit according to claim 6, further including means for displaying one of the result of the division of said dividing means and the result of the conversion of said converter means.

8. A transit according to claim 1, wherein said detection means generates a pulse in accordance with the displacement of an angle of 1 second between said first rotational member and said second rotational member.

9. A transit including:
   (a) a first rotational member provided with a collimator and supported on said transit for rotation about a predetermined axis;
   (b) a second rotational member supported on said transit for rotation about said predetermined axis;
   (c) detection means for generating a pulse in accordance with a predetermined angle of displacement between said first rotational member and said second rotational member, said detection means detecting the direction of said displacement; and
   (d) counter means for counting the number of said pulses, the maximum countable pulse number of said counter means corresponding to an angle which is integer times as great as 360°, said detection means generating a signal to cause said counter means to count down, said counter means counting down from said maximum countable pulse number in response to said signal when the content of said counter means is zero.

10. A transit according to claim 9, wherein said counter means puts out a signal corresponding to the counted pulse number, and said transit further includes means for converting the angle indicated by the signal from said counter means into an angle greater than 0° and less than 360°.

11. A transit according to claim 9, wherein said counter means puts out a signal corresponding to the counted pulse number, and said transit further includes setting means for setting a number, and dividing means for dividing the angle indicated by the signal from said counter means by the number set by said setting means.

* * * * *